June 14, 1949.                S. H. COOK                2,473,362
                       MOTION TRANSMISSION MECHANISM
Filed Dec. 23, 1944                                    2 Sheets-Sheet 1

INVENTOR.
SHERMAN H. COOK
BY George F. Goodyear
ATTORNEY

June 14, 1949.  S. H. COOK  2,473,362
MOTION TRANSMISSION MECHANISM
Filed Dec. 23, 1944  2 Sheets-Sheet 2

INVENTOR.
SHERMAN H. COOK
BY George F. Goodyear
ATTORNEY

Patented June 14, 1949

2,473,362

UNITED STATES PATENT OFFICE 2,473,362

MOTION TRANSMISSION MECHANISM

Sherman H. Cook, Ferguson, Mo., assignor to Curtiss-Wright Corporation, a corporation of Delaware Application December 23, 1944, Serial No. 569,601

4 Claims. (Cl. 244—102)

1

This invention relates generally to transmission mechanism for transmitting motion to a plurality of actuatable devices. More particularly, it relates to transmission mechanism for transmitting motion whereby to extend and/or retract aircraft landing gear.

In the extension and retraction of aircraft landing gear, three different types of mechanism have been employed; electrical, hydraulic and mechanical. The present invention relates to mechanism of the mechanical type, which may be used either in place of electrical or hydraulic mechanisms, or may be used as an emergency adjunct to electrical or hydraulic systems.

It is therefore an object of this invention to provide a relatively simple, efficient and trouble-free mechanism fully capable of rapid operation for extending or retracting the landing gear assemblies of an aircraft or the like. Another object is to provide a landing gear actuating mechanism which may be used as the basic or primary means for actuating the gears, or as an auxiliary or emergency actuating means. A further object is to provide a unitary mechanism which may be utilized to advantage in practically any type of aircraft landing gear installation. A still further object is to provide a compact landing gear actuating means which may be manually or power operated, as desired, in order to meet the requirements of the particular landing gear installation selected. Another object is to provide an actuating mechanism especially useful as an auxiliary unit for a landing gear installation and in which the mechanism provides independent driving means for each landing gear such that, upon partial or complete failure of the primary operating means, the auxiliary mechanism will be capable of assuming the burden, in part or in whole, of actuating the landing gear installation. Still another object is to provide an auxiliary actuating mechanism capable of rapid and positive correction of any operational failure in a primary actuating system. Still a further object is to provide an actuating mechanism of the character noted and in which the mechanism upon operation will automatically find and correct any faulty operation of any of the landing gear units by the primary actuating system. Other objects will appear hereinafter.

Figure 1:
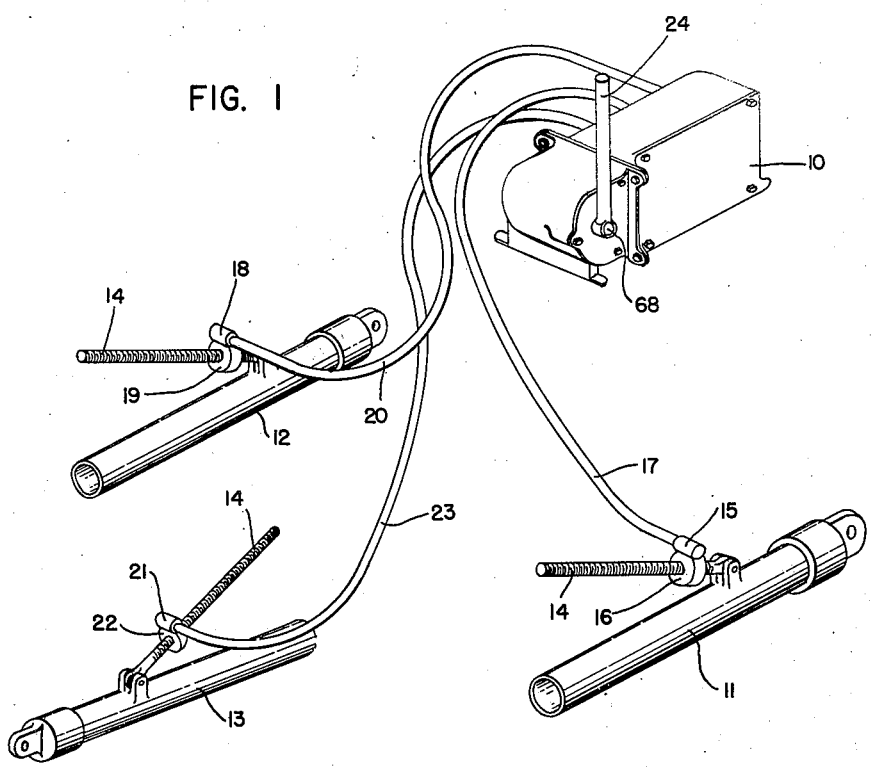
Figure 3:
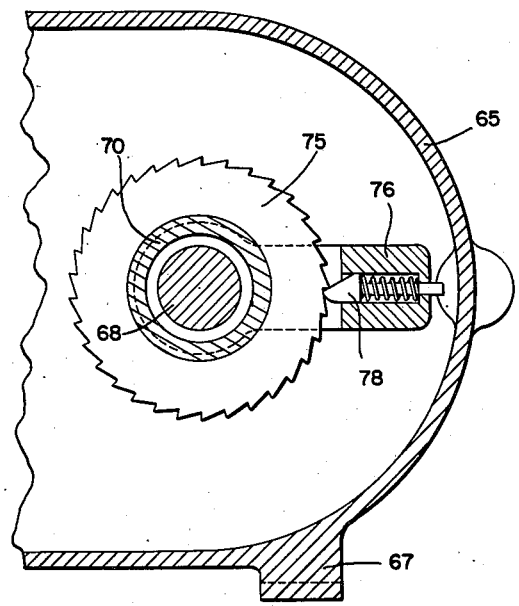
Figure 2:
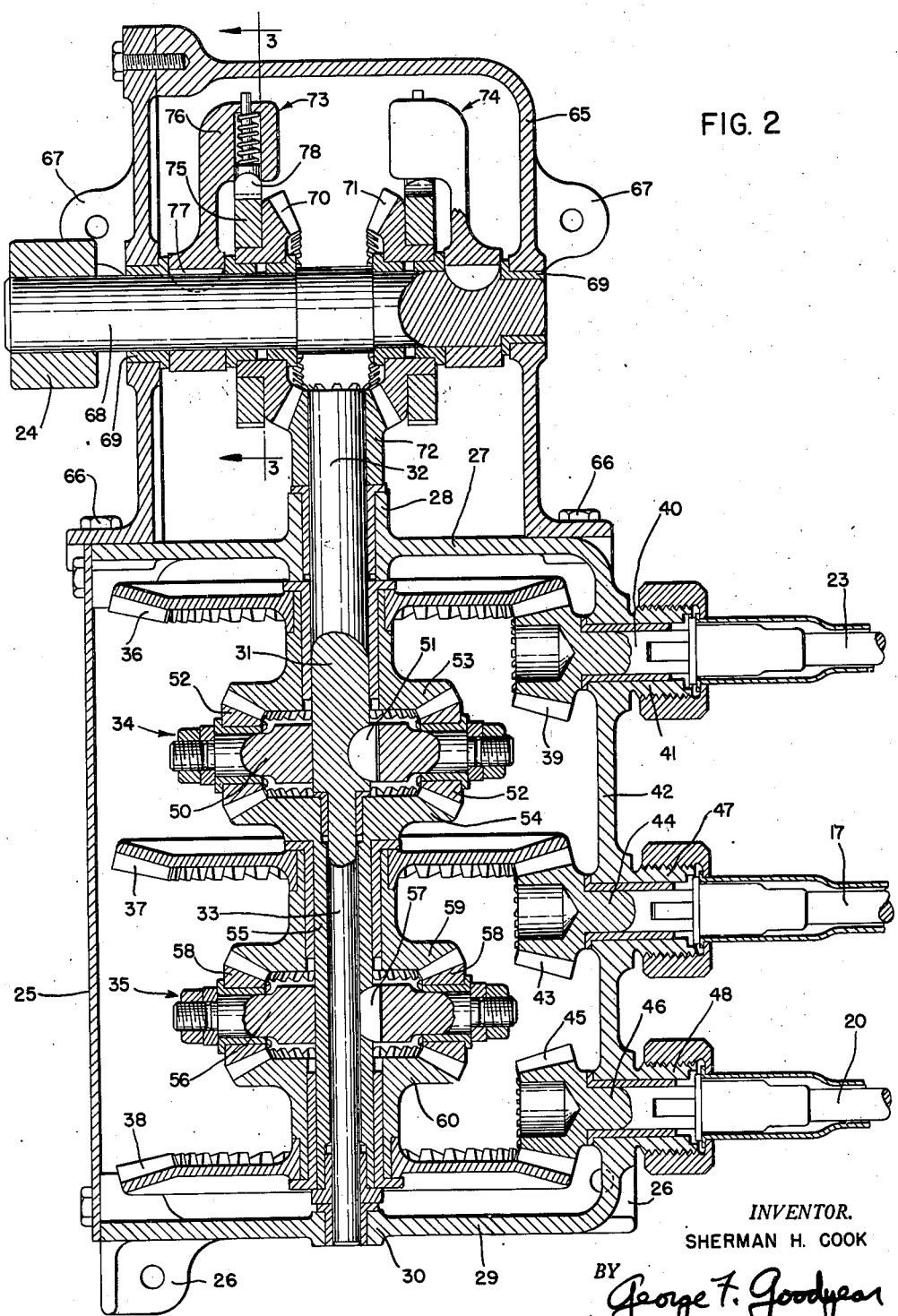

These objects are accomplished by the herein described invention, which may be more readily understood by reference to the accompanying drawings, in which: Figure 1 illustrates in diagrammatic perspective an operating installation for the landing gear actuating mechanism herein preferred; Figure 2 is an enlarged plan view, in section, showing the details of the operating system illustrated in Figure 1; Figure 3 is a section taken along the line 3—3 of Figure 2.

Referring now to Figure 1, the preferred landing gear actuating mechanism 10 is illustrated in connection with a tricycle type landing gear installation which includes a pair of main struts 11 and 12 and a nose strut 13. The particular means for attaching these struts to the fuselage or other structural portion of the airplane is not important here. However, the actuating element for each strut is important, and as shown comprises a threaded member or screw jack 14 pivotally connected to the strut in any suitable manner. Considering only the main strut 11 for the moment, it will be observed that a worm 15 and suitably internally threaded worm gear 16 is operably related with the screw jack 14. Though not shown, worm gear 16 is suitably anchored or attached to the aircraft whereby to restrain such worm gear 16 from bodily axial movement along the screw jack 14. Thus it is evident that, upon rotation of worm 15, the worm gear 16 will rotate in place and, as a result, screw jack will be extended or retracted, depending upon the direction of rotation of the worm and gear. Rotation of worm 15 is accomplished through a flexible shaft 17 which, in turn, is actuated by a suitable power take-off shaft provided at the device 10. In like manner, right-hand strut 12 and jack 14 is actuated by a worm 18, worm gear 19 and flexible shaft 20. Similarly, the nose strut 13 and jack 14 14 may be operated by means of a worm 21, worm gear 22 and flexible shaft 23. Hence, actuating mechanism 10 affects extension or retraction of the struts 11, 12 and 13 through the flexible shafts 17, 20 and 23 and the respective worm and worm gear units 15—16, 18—19 and 21—22 provided therefore. A single operating lever 24 is provided at the actuator 10 and the same is suitably positioned at the side of the pilot's cockpit. While there is shown a lever 24, it should be understood that a crank or other means may be substituted with equal advantage.

The details of the actuating mechanism 10 are shown in Figures 2 and 3. The actuating mechanism 10 is enclosed in a suitable housing 25, the same being provided with integrally formed bosses 26 adapted for mounting or securing the housing to suitable members of the fuselage structure. An end wall 27 of the housing 25 is suitably formed to provide a bearing boss 28 while the opposite end wall 29 is also provided with a bearing boss 30. A single integral shaft having an enlarged operating portion 31 and a portion 33 of reduced diameter is operably mounted in these bearing bosses 28 and 30, in the manner shown. A portion 32 of the enlarged end 31 of the operating shaft extends beyond the housing 25 for a purpose later appearing. In order to clarify as much as possible the description of the structural and operational parts and elements of the mechanism shown in Figure 2, all reference to details believed to be entirely and clearly obvious to one skilled in the art to which this invention relates will be omitted.

The system of gearing now to be described consists of a first planetary or epicyclic gear unit 34, a second planetary or epicyclic gear unit 35 and a plurality of operating bevel gears 36, 37 and 38. The latter bevel gears are provided with suitable connections to certain of the gears of the planetary units. Also, as shown, operating bevel gear 36 meshes with a bevel pinion 39 mounted on a stub shaft 40, which bears in a suitable boss 41 in side wall 42 of housing 25. The outwardly projecting end of stub shaft 40 is suitably adapted to receive the end of flexible cable 23. In like manner, bevel gear 37 meshes with a bevel pinion 43 formed on a stub shaft 44, the latter shaft being adapted for driving connection with the flexible shaft 17. Similarly a third bevel pinion 45, meshing with operating bevel gear 38, is formed on stub shaft 46 and the latter connects with and drives the flexible shaft 20. Stub shafts 44 and 46 are operably carried in respective bosses 47 and 48 formed on wall 42 of the housing 25.

The planetary unit 34 positioned between bevel gears 36 and 37 comprises a spider member 50 keyed to shaft portion 31 by a suitable key 51 and carrying a plurality of planetary bevel pinions 52, two thereof being shown. A bevel sun gear 53, meshing with these planet pinions 52, is freely revolvably mounted on shaft portion 32. Sun gear 53 is affixed to bevel gear 36 and thus rotates in unison therewith. An opposing sun gear 54, freely revolvably mounted on shaft portion 33 and having a sleeve 55 extending substantially the length of the shaft portion 33, also meshes with the planet pinions 52.

The second planetary unit 35, located between bevel gears 37 and 38, comprises a spider member 56 which is fixed to sleeve shaft 55 by means of a suitable key element 57 and thus turns or revolves with the sun gear 54 of the first planetary unit 34. A plurality of planetary bevel pinions 58, two being shown, are revolvably mounted on spider 56. A bevel sun gear 59 meshes with the planet pinions 58 and is free to turn on sleeve 55 as shown. The bevel gear 37, in turn, is affixed to the sun gear 59 and rotates in unison therewith. A second bevel sun gear 60, also meshing with planet pinions 58, is revolvably mounted on the end portion of sleeve shaft 55 and is affixed and rotates with the bevel gear 38.

It is to be observed here that the sun gears 53—54 and 59—60 are each identical as to size, that the planetary pinions 52 and 58 are also identical, and that the operating bevel gears 36, 37 and 38 are identical. Hence, the same driving force is applied to all three flexible shafts 17, 20 and 23, provided the planetary units 34 and 35 are free to rotate in unison and without relative rotation between the planet pinions and sun gears of each such unit.

It should be clear now that sun gear 53 and bevel gear 36 rotate in unison; that sun gear 54 serves to rotate the spider 56 and planet pinion 58 of the planetary unit 35; that sun gear 59 drives bevel gear 37; and that sun gear 60 carries with it in rotation the bevel gear 38. The bevel gears 36, 37, and 38, in turn, drive the respective flexible shafts 23, 17 and 20 through the interposition of bevel pinions 39, 43 and 45 respectively.

As stated hereinbefore, the portion 32 of the operating shaft extends from the end wall 27 of housing 25. Any suitable operating mechanism, such as a crank, may be keyed or otherwise affixed thereto for operating the actuating mechanism above described. Available space in the pilot's cockpit may be such that a crank of suitable mechanical advantage may be installed. However, in many installations the actuating device 10 is most conveniently located on the floor and to one side of the pilot's position. In these cases, the operating lever is most likely to be of an oscillating or pump handle type, and such is the form shown in the drawings. Such a lever is shown at 24, together with a suitable mechanism operably mounted in a housing 65, the same being secured to the housing 25 by suitable bolts 66 and to the airplane structure by integrally formed lugs or bosses 67. Because of the fact that the actuating mechanism 10 would normally be placed so as to extend parallel to the longitudinal axis of the airplane, it becomes necessary to mount the lever 24 on a suitable shaft 68 which is normal to the shaft portion 32. Shaft 68 is carried in wall bearings 69, and, in turn, supports a pair of opposed bevel gears 70 and 71 freely rotatable with respect thereto. The gears 70 and 71 mesh with a sleeve type bevel pinion 72 suitably keyed or affixed to the shaft portion 32, as shown. Oscillatory motion of shaft 68 is transformed into unidirectional rotation of shaft portion 32 by suitable ratchet devices 73 and 74 keyed or otherwise affixed to shaft 68 and associated respectively with bevel gears 70 and 71, and functioning to limit the useful work of the gears to a predetermined direction of rotation. For example, ratchet 73, consisting of a ratchet gear 75 secured to gear 70 as shown, operating arm 76 keyed to shaft 68 as at 77 and a spring depressed detent or pawl 78, may be selected to rotate gear 70 in a counter-clockwise direction as viewed in Figure 3. Ratchet unit 74, identical in all respects with ratchet unit 73, but having its ratchet wheel teeth reversely formed, is adapted to rotate gear 71 in the opposite direction. Hence, fore and aft oscillations of the lever 24 will be transformed, by the reversely acting ratchet units 73 and 74, into continuous unidirectional rotation of operating shaft 32. The energy expended by the pilot in moving the lever 24 is substantially fully converted into useful work by the arrangement of operating elements just described.

Obviously the cranking mechanism above described will not permit the use of the actuating device 10 for both extension and retraction of the landing gear assemblies, unless some additional means is provided whereby the operation of the lever 24 may be shifted or converted from one function for landing gear extension to another function for retraction. This may be accomplished by mounting ratchet devices 73 and 74 to operate in the same direction, instead of opposite directions, and at the same time providing a gear shift mechanism whereby only one of the gears 70 or 71 is operably connected to gear 72 at any one time. However, it is highly desirable to keep such a mechanism as simple as possible for reliability and convenience of maintenance. As the primary value and utility of this actuating mechanism is as an emergency extending unit, it is preferred that it operate only in one direction. Failure of a primary system properly to extend the landing elements of an airplane is much more serious for the pilot, crew and passengers than would be the case where the landing gear could not be raised by the primary system. In the latter case, the safe operation of the airplane is not seriously imperiled. The failure to extend the landing gear units is a very real danger and one that has merited a great amount of time and attention.

To illustrate one condition of possibile emergency operation of the mechanism above described, let it be assumed that the primary landing gear actuating mechanism (not shown) has only partially extended the nose gear 13 and has entirely failed to extend the main gears 11 and 12. The pilot of the airplane, entirely without need to ascertain or know in what position the landing gears are placed, will immediately begin to rotate the operating shaft 32. The action of the mechanism will be as follows: The first planetary unit 34 will begin to revolve, and since there is nothing to prevent rotation of any of the bevel gears 36, 37 or 38, the sun gears 53—54 will be rotated in unison and planet gears will simply travel about axis of shaft 31 without relative rotation about the axis of the spider 50. Sun gears 59—60 of planetary unit 35 will also be rotated in unison by the spider 56 and in the same manner as for the first unit 34. Hence, all the landing gears will be extended in unison through the operation of the flexible shafts and worm gear units before described.

Since nose gear 13 was only partially extended, it will reach a fully extended position prior to the main gears 11 and 12 and, consequently, upon reaching this fully extended position, the bevel gear 36 will stop rotating. This has the effect of stopping sun gear 53, whereupon the sun gear 54 will immediately double its rotative speed. Planetary unit 34 then becomes an accelerator for the second planetary unit 35, and as a result the main gears 11 and 12 increase or double their rate of movement until fully extended. Similarly, if the left hand landing gear strut 11 should lead the strut 12, then when strut 11 reached full extension bevel gear 37 would stop and thus planetary unit 35 would become an accelerator for the last bevel gear 38. A brief study of the function of the mechanism will reveal that there are other possible sequences of landing gear operations; but in each such operational sequence, the planetary unit 34 or 35, as the case may be, will serve to accelerate the action of one or more of the large bevel gears which operate the small bevel pinions on each of the flexible shafts. Reversing the rotation of shaft 32 will affect the retraction of the landing gear struts; and if all struts move in unison, the actuating mechanism and particularly planetary units 34 and 35 will also move in unison. Should any one of the struts lead the others, the associated planetary unit will tend to accelerate the lagging strut so that the total time consumed completely to retract all the struts will be considerably less than the time to retract each strut separately.

It will now be observed that the landing gear actuating mechanism above described in detail fully attains all the advantages and claims for novelty and utility before pointed out. It is worthy of serious consideration because of its simplicity, extreme mechanical reliablity, positive driving connection with the units to be moved, irreversibility of movement except under the direct influence of the pilot's operating lever or crank, and compact structure permitting quick and easy inspection and service attention.

The details of construction and operation of the present invention have been given in connection with a preferred embodiment. However, it should be understood that certain changes, alterations, additions and eliminations may be desired or become advantageous as experience may dictate, but without departing from the spirit and instructive sense in which the invention is presented and as defined by the claims hereinafter appended.

I claim:

1. In an airplane, a landing gear actuating system which includes a mechanically operated jack for each of plural landing gears, a separate jack operating shaft for each landing gear, a rotatable drive element and a differential gearing connecting the drive element to each of said shafts, said differential gearing comprising at least one pair of gears coaxial with the drive element and each of which is operably connected to one of said shafts, and a gear meshed with said coaxial gears and mounted for free rotation on said drive element.

2. A landing gear actuating mechanism for use in air craft, said mechanism including a pair of differential gear units, each of said units comprising differential gearing having a drive element and a pair of driven elements which are operated in unison or differentially by the drive element, one driven element of the first of said units being connected to the drive element of the second of said units, the other driven element of the first unit and the driven elements of the second unit each being connected to a landing gear actuating unit for operating the same.

3. In an airplane having a plurality of retractable landing gear units, an extension system therefor comprising a mechanically operated jack for each landing gear unit, a separate jack operating shaft for each of said jacks, and an actuating mechanism for said jack shafts, said mechanism comprising a drive shaft and differential gearing between the drive shaft and the jack shafts, said differential gearing comprising a drive element carried by the drive shaft and a plurality of driven elements operated in unison or differentially by said drive element, each of said driven elements being connected to a different one of said jack shafts.

4. In an airplane having a plurality of retractable landing gear units, an extension system therefor comprising a mechanically operated jack for each landing gear unit, a rock shaft, a rotary drive shaft and a plurality of rotary driven shafts, each of said driven shafts being operably connected to one of said jacks, means connecting the rock shaft to the drive shaft for translating oscillatory movement of the rock shaft into unidirectional rotary motion of the drive shaft, and a differential gearing connecting the drive and driven shafts, said differential gearing comprising a drive element carried by the drive shaft and a pair of driven elements operated in unison or differentially by said drive element, each of said driven elements being connected to a different one of said driven shafts.

SHERMAN H. COOK.

(References on following page)

REFERENCES CITED

The following references are of record in the file of this patent:

UNITED STATES PATENTS

| Number | Name | Date |
|---|---|---|
| 19,798 | Sleven | Mar. 30, 1858 |
| 855,062 | Kirkpatrick | May 28, 1907 |
| 1,011,746 | Clark | Dec. 12, 1911 |
| 1,035,645 | Scherling | Aug. 13, 1912 |
| 1,295,335 | Littlejohn | Feb. 25, 1919 |
| 1,686,431 | Wyman | Oct. 2, 1928 |
| 1,736,226 | Spencer | Nov. 19, 1929 |
| 1,742,744 | Wyman | Jan. 7, 1930 |
| 1,901,436 | Coates | Mar. 14, 1933 |
| 2,135,699 | Campbell | Nov. 8, 1938 |
| 2,320,547 | Tiger | June 1, 1943 |
| 2,366,734 | Lear | Jan. 9, 1945 |

FOREIGN PATENTS

| Number | Country | Date |
|---|---|---|
| 338,502 | Italy | Mar. 31, 1936 |